(12) United States Patent
Park et al.

(10) Patent No.: US 8,849,937 B2
(45) Date of Patent: Sep. 30, 2014

(54) APPARATUS AND METHOD FOR TIME SYNCHRONIZATION BY AUTOMATICALLY CONTROLLING SENDING MESSAGE COUNT OF MASTER

(75) Inventors: Gun-Woo Park, Gyeonggi-do (KR); Sang-Cheol Mun, Gyeonggi-do (KR)

(73) Assignee: Dasan Networks, Inc., Seongnam-si (KR)

( * ) Notice: Subject to any disclaimer, the term of this patent is extended or adjusted under 35 U.S.C. 154(b) by 233 days.

(21) Appl. No.: 13/434,179

(22) Filed: Mar. 29, 2012

(65) Prior Publication Data
US 2013/0246551 A1 Sep. 19, 2013

(30) Foreign Application Priority Data
Mar. 13, 2012 (KR) .......................... 10-2012-0025752

(51) Int. Cl.
*G06F 15/16* (2006.01)
(52) U.S. Cl.
USPC .......................................... 709/208; 709/248
(58) Field of Classification Search
None
See application file for complete search history.

(56) References Cited

U.S. PATENT DOCUMENTS

| | | | | |
|---|---|---|---|---|
| 6,373,834 B1* | 4/2002 | Lundh et al. | .................. | 370/350 |
| 7,496,059 B2* | 2/2009 | Yoon | ............................. | 370/311 |
| 7,848,360 B2* | 12/2010 | Gotz et al. | .................... | 370/503 |
| 8,504,864 B2* | 8/2013 | Menon et al. | ................. | 713/401 |

FOREIGN PATENT DOCUMENTS

| | | |
|---|---|---|
| EP | 2 063 553 A1 | 5/2009 |
| KR | 10-2009-0093206 | 9/2009 |
| KR | 10-2009-0122825 | 12/2009 |

* cited by examiner

*Primary Examiner* — John B. Walsh
(74) *Attorney, Agent, or Firm* — NSIP Law

(57) ABSTRACT

Provided are an apparatus and method for time synchronization in a Precision Time Protocol (PTP) network. According to an aspect, there is provided a time synchronization apparatus including: a synchronization unit configured to perform time synchronization between a master and at least one slave based on the number of synchronization messages that are sent from the master; a state-of-synchronization determiner configured to measure performance of the synchronization to thereby determine the state of the synchronization; and a number-of-messages adjustor configured to adjust the number of synchronization messages based on the state of the synchronization. Therefore, by automatically adjusting the number of synchronization messages that are sent from a master according to network traffic, the states of slave nodes, etc., it is possible to minimize entire network traffic and optimize the synchronization performance of nodes.

12 Claims, 4 Drawing Sheets

APPARATUS AND METHOD FOR TIME SYNCHRONIZATION BY AUTOMATICALLY CONTROLLING SENDING MESSAGE COUNT OF MASTER

CROSS-REFERENCE TO RELATED APPLICATION

This application claims the benefit under 35 U.S.C. §119 (a) of a Korean Patent Application No. 10-2012-0025752, filed on Mar. 13, 2012, the entire disclosure of which is incorporated herein by reference for all purposes.

BACKGROUND

1. Field

The following description relates to an apparatus and method for time synchronization in a Precision Time Protocol (PTP) network, and more particularly, to a technique for automatically controlling the number of sending messages that are sent from a master node.

2. Description of the Related Art

A representative protocol for time synchronization in an asynchronous network based on packet transmission is the IEEE 1588 Precision Time Protocol (PTP). Conventional time synchronization techniques that are used in a general PTP network perform time synchronization by deciding reference times through their specific algorithms and calculating delay times between masters and slaves with various methods. However, the conventional time synchronization techniques can reflect neither the traffic state of a network nor the states of slave nodes when the techniques are actually applied to the network, which leads to great deterioration in synchronization performance when excessive traffic occurs in the network.

SUMMARY

The following description relates to a time synchronization apparatus and method for optimizing synchronization performance by automatically controlling the number of synchronization messages that are sent from a master according to the traffic state of a network or the states of slave nodes to thereby deal with time synchronization adaptively according to the traffic state of the network, etc.

In one general aspect, there is provided a time synchronization apparatus for performing time synchronization by automatically adjusting a number of synchronization messages that are sent from a master, the apparatus including: a synchronization unit configured to perform time synchronization between the master and at least one slave based on the number of synchronization messages that are sent from the master; a state-of-synchronization determiner configured to measure performance of the synchronization to thereby determine the state of the synchronization; and a number-of-messages adjustor configured to adjust the number of synchronization messages based on the state of the synchronization.

The state-of-synchronization determiner determines the state of the synchronization to be "synchronization stability" if the performance of the synchronization is measured to be within a predetermined threshold value, and if the measured performance of the synchronization is not within the predetermined threshold value, the state-of-synchronization determiner determines the state of the synchronization to be "synchronization instability".

The number-of-messages adjustor decreases the number of synchronization messages by a predetermined value if the state of the synchronization is determined to be "synchronization stability", and increases the number of synchronization messages by the predetermined value if the state of the synchronization is determined to be "synchronization instability".

If the performance of synchronization measured when a number of synchronization messages resulting from decreasing the number of synchronization messages by the predetermined value reaches a minimum number of synchronization messages supportable by the master is determined to be "synchronization stability", or if the performance of synchronization measured after increasing the number of synchronization messages by the predetermined value is determined to be "synchronization stability", the state-of-synchronization determiner determines the state of the synchronization to be "message stability".

The state-of-synchronization determiner determines, if a number of synchronization messages resulting from increasing the number of synchronization messages by the predetermined value exceeds a maximum number of synchronization messages supportable by the master, the state of the synchronization to be "synchronization impossibility".

The number-of-messages adjustor adjusts, if the state of the synchronization is determined to be "synchronization impossibility", the number of synchronization messages to a reference number of synchronization messages.

The time synchronization apparatus further includes a policy setting unit configured to set a time synchronization policy including a reference number of synchronization messages.

The time synchronization policy further defines a range of numbers of synchronization messages supportable by the master, or criteria for deciding an optimal number of synchronization messages for a plurality of slaves.

In another general aspect, there is provided a time synchronization method through automatic adjustment in number of synchronization messages that are sent from a master, the method including: performing time synchronization between the master and at least one slave based on the number of synchronization messages that are sent from the master; measuring the performance of the synchronization to thereby determine the state of the synchronization; and adjusting the number of synchronization messages based on the state of the synchronization, and then repeating operations of performing time synchronization between the master and the slave, of measuring the performance of the synchronization to determine the state of the synchronization, and of adjusting the number of synchronization messages based on the state of the synchronization.

The measuring of the performance of the synchronization to thereby determine the state of the synchronization includes determining the state of the synchronization to be "synchronization stability" if the measured performance of the synchronization is within a predetermined threshold value, and if the measured performance of the synchronization is not within the predetermined threshold value, determining the state of the synchronization to be "synchronization instability".

The adjusting of the number of synchronization messages that are sent from the master includes decreasing the number of synchronization messages by a predetermined value if the state of the synchronization is determined to be "synchronization stability", and increasing the number of synchronization messages by the predetermined value if the state of the synchronization is determined to be "synchronization instability".

The measuring of the performance of the synchronization to thereby determine the state of the synchronization includes determining the state of the synchronization to be "message stability", if the performance of synchronization measured when a number of synchronization messages resulting from decreasing the number of synchronization message by the predetermined value reaches a minimum number of synchronization messages supportable by the master is determined to "synchronization stability", or if the performance of synchronization measured after increasing the number of synchronization messages by the predetermined value is determined to "synchronization stability".

The measuring of the performance of the synchronization to thereby determine the state of the synchronization includes determining the state of the synchronization to be "synchronization impossibility" if a number of synchronization messages resulting from increasing the number of synchronization messages by the predetermined value exceeds a maximum number of synchronization messages supportable by the master, The adjusting of the number of synchronization messages based on the state of the synchronization includes adjusting the number of synchronization messages to a reference number of synchronization messages if the state of the synchronization is determined to be "synchronization impossibility".

Other features and aspects will be apparent from the following detailed description, the drawings, and the claims.

Figure 1:
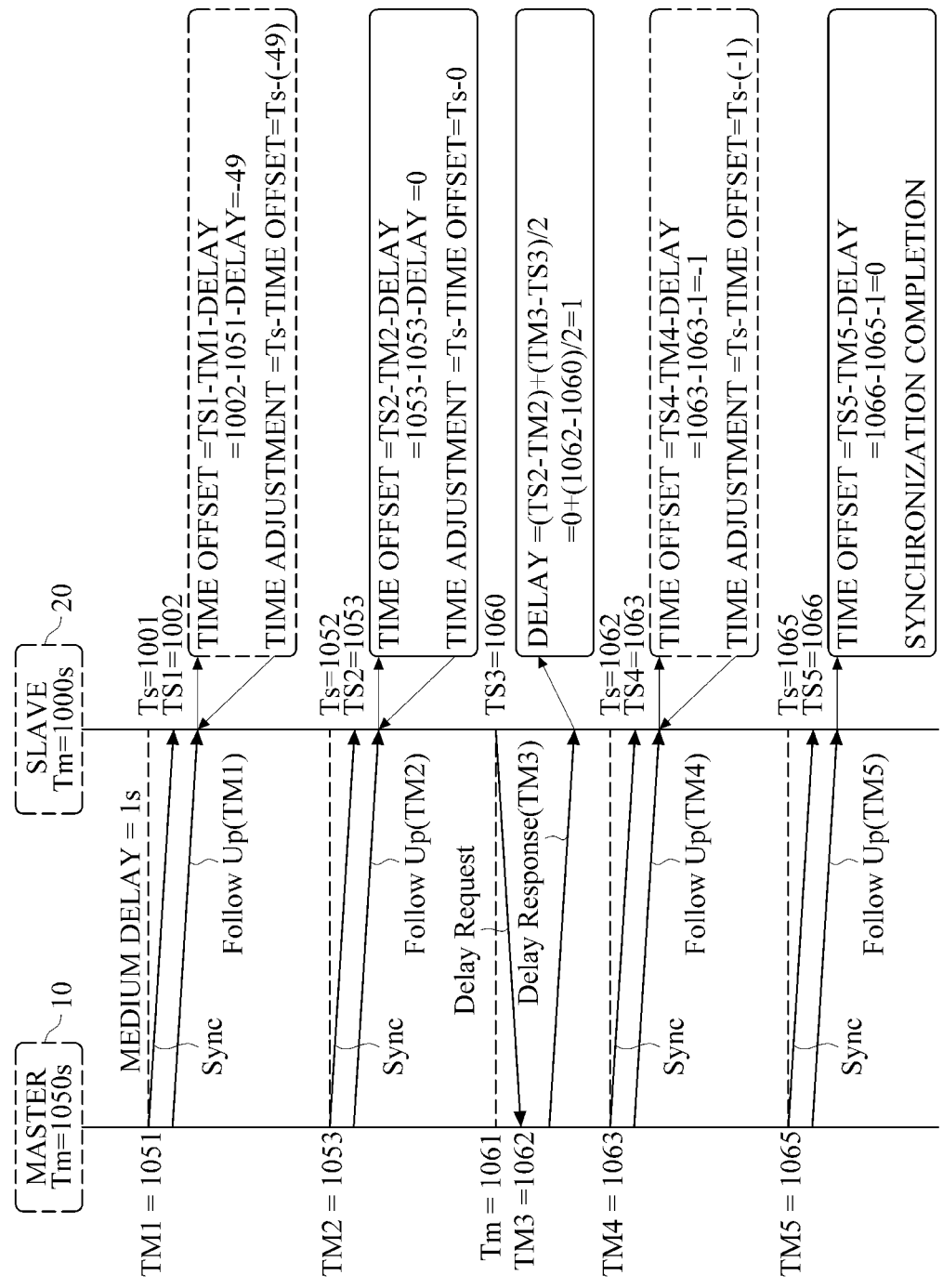
FIG. 1 is a view for explaining a conventional time synchronization technique based on the IEEE 1588 standard.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a view for explaining a conventional time synchronization technique based on the IEEE 1588 standard. The IEEE 1588-based time synchronization technique will be described with reference to FIG. 1, below.

Referring to FIG. 1, a network includes a maser 10 that provides a reference clock signal, and a plurality of slaves (20 for each slave) that perform synchronization by synchronizing their own time information with the reference clock signal of the master 10. The master 10 transmits a plurality of synchronization messages to the respective slaves 20 in order to enable the slaves 20 to synchronize their own times with the reference clock signal of the master 10. Referring to FIG. 1, the synchronization messages may include Sync messages and FollowUp messages TM1, TM2, TM4, and TM5. The Sync messages may be initially set to be transmitted to the slaves 20 at regular time intervals (for example, every 2 seconds).

The master 10 periodically multicast-transmits its own synchronization information to all the slaves 20 belonging to the corresponding network. Each slave 20 receives a FollowUP message (for example, TM1) from the master 10 to obtain a time offset and then adjusts its own time based on the time offset. At this time, since no information about transmission time delay is transmitted between the master 10 and the slave 20, the slave 20 cannot be exactly synchronized to the master 10.

Accordingly, the slave 20 transmits a delay request to the master 10, and the master 10 transmits a delay response TM3 including its own current time to the slave 20 in response to the delay request from the slave 20. Thereby, the slave 20 can acquire information about transmission delay, calculate its own accurate synchronization time using a FollowUp message TM4 received from the master 50 at the next time, based on the information about transmission delay, and changes its own time based on the calculated accurate synchronization time. Information about the changed time is transferred to the upper physical layer through a method such as SNTP so that an application layer can use the accurate synchronization time.

In this way, the IEEE 1558 standard can ensure accurate synchronization even in a network where a plurality of switches are provided in correspondence to a router. However, since the number of synchronization messages that are sent from the master 10 to the slave 20 during a predetermined time period, that is, a transmission interval of synchronization messages that are sent from the master 10 to the slave 20 is initially fixed to a predetermined value, changes in environmental factors cannot be reflected to synchronization in real time, which leads to significant deterioration of synchronization performance.

Figure 2:
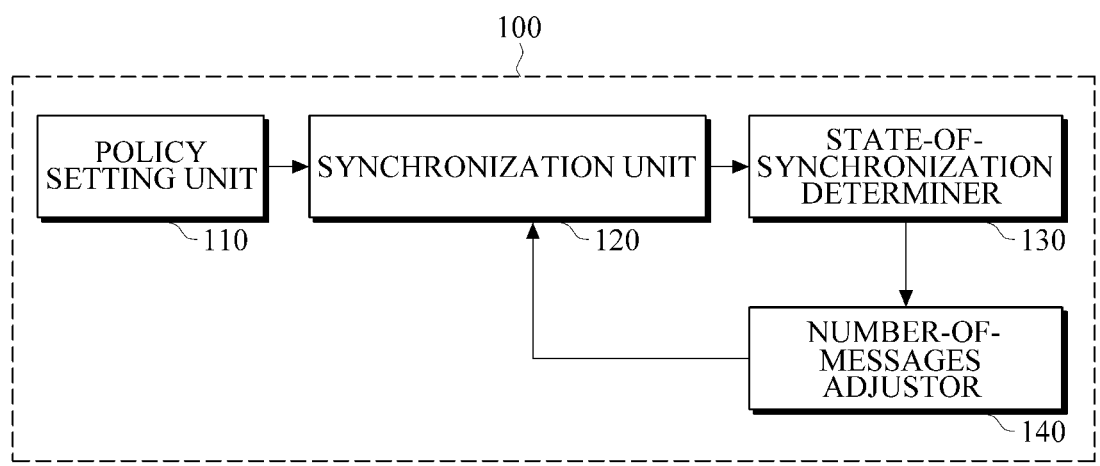
FIG. 2 is a block diagram illustrating an example of a time synchronization apparatus.

FIG. 2 is a block diagram illustrating an example of a time synchronization apparatus 100. Referring to FIG. 2, the time synchronization apparatus 100 may include a synchronization unit 120, a state-of-synchronization determiner 130, and a number-of-messages adjustor 140. The time synchronization apparatus 100 may be installed in a master or separately provided between a master and a slave.

The synchronization unit 120 may perform time synchronization between a master and at least one slave based on the number of synchronization messages that are sent from the master. At this time, the time synchronization may be performed with a unique synchronization method that is set in the master. The unique synchronization method may be one of general time synchronization methods that are supported by the IEEE 1588 standard and have been well-known to those skilled in the art, and accordingly a detailed description therefore will be omitted.

Generally, an IEEE 1588 master has a function for manual adjustment of a time interval at which a synchronization message is transmitted to slaves. That is, the IEEE 1588 master may transmit synchronization messages to slaves at regular time intervals (for example, per 2 seconds) that are manually set, thereby performing synchronization with the slaves. The transmission time interval of synchronization messages may have great influence on synchronization between the master and slaves. If the transmission time interval of synchronization messages is short, this helps accurate synchronization, but a too short transmission time interval of synchronization messages increases network traffic, resulting in performance deterioration. On the contrary, if the transmission time interval of synchronization messages is too long, this also may deteriorate synchronization performance. In the current example, by automatically adjusting a transmission time interval of synchronization messages that are transmitted from a master, that is, the number of synchronization messages which a master transmits during a predetermined time period, optimized synchronization may be accomplished through environment-based active control.

The master performs, when starting operation, time synchronization with the slaves based on a reference number of synchronization messages, which is initially set. The reference number of synchronization messages may be set to an arbitrary value or to a most appropriate value through preprocessing in consideration of various environmental factors (for example, a network traffic state, the performances of the master or slaves, etc.). For example, the reference number of synchronization messages may be set to a mean value of the proper numbers of synchronization message, which have been decided through several preprocessings, or to an intermediate value between maximum and minimum values of synchronization message, which are supportable by the master. The synchronization unit 120 may perform synchronization based on the reference number of synchronization messages repeatedly until synchronization is complete.

The state-of-synchronization determiner 130 may measure the performance of the synchronization performed by the synchronization unit 120 to thereby determine the state of the synchronization. At this time, the state of synchronization may be determined to be any one of "message stability", "synchronization stability", "synchronization instability", and "synchronization impossibility", however, the above-mentioned states of synchronization may be only exemplary, and more various states of synchronization may be used. Here, the "message stability" means a state where the number of synchronization messages needs to be no longer adjusted since stable synchronization is being maintained due to setting of an optimized number of synchronization messages. The "synchronization stability" means a state where synchronization performance has been measured to be within a predetermined threshold value after synchronization based on a currently set number of synchronization messages. The "synchronization instability" means a state where the measured synchronization performance is not within the predetermined threshold value. Also, the "synchronization impossibility" means a state where the master cannot perform synchronization any longer, that is, the case where synchronization has not been stabilized even when a maximum number of synchronization messages supportable by the master is used.

The state-of-synchronization determiner 130 may determine the state of the synchronization to be "synchronization stability" if the synchronization performance is measured to be within the predetermined threshold value after synchronization based on the number of synchronization messages, and if the measured synchronization performance is not within the predetermined threshold value, the state-of-synchronization determiner 130 may determine the state of the synchronization to be "synchronization instability". The predetermined threshold value may be set in advance by a manager, and the manager may select a most appropriate value through several preprocessings and set the selected value to the predetermined threshold value.

If the state of the synchronization is determined to be "synchronization stability" by the state-of-synchronization determiner 130, the number-of-messages adjustor 140 may decrease the number of synchronization messages by a predetermined value, whereas if the state of the synchronization is determined to be "synchronization instability", the number-of-messages adjustor 140 may increase the number of synchronization messages by the predetermined value. The number of synchronization messages may be adjusted by causing the master to adjust a time interval at which a synchronization message is transmitted. The synchronization unit 120 continues to perform synchronization based on the adjusted (decreased or increased) number of synchronization messages, and the state-of-synchronization determiner 130 measures the performance of synchronization performed based on the adjusted number of synchronization messages to thereby determine the state of the synchronization. According to the determined state of the synchronization, the number-of-messages adjustor 140 may again adjust the number of synchronization messages.

The operation of adjusting the number of synchronization messages may be continuously performed until the performance of synchronization is measured to be "message stability" or "synchronization impossibility". That is, if the state of synchronization is determined to be "message stability", the number-of-messages adjustor 140 does no longer adjust the number of synchronization messages.

If the "synchronization stability" state is maintained for a long time so that the number of synchronization messages is continuously reduced to become smaller than a minimum number of synchronization messages supportable by the master, the state-of-synchronization determiner 130 may determine the state of synchronization to be "message stability". Also, if the performance of synchronization measured after decreasing the number of synchronization messages is not within the predetermined threshold value and thus the performance of synchronization again measured after increasing the number of synchronization messages is determined to be "synchronization stability", or on the contrary, if the performance of synchronization measured after increasing the number of synchronization messages is within the predetermined threshold value and thus the performance of synchronization again measured after decreasing the number of synchronization messages is determined to be "synchronization instability", the state-of-synchronization determiner 130 may determine the current state of synchronization to be "message stability".

Meanwhile, the "synchronization impossibility" corresponds to the case where synchronization stability cannot be accomplished through adjustment in number of synchronization messages. Criteria for determining "synchronization impossibility" may be set in advance by a manager. For example, if an increased number of synchronization messages exceeds the maximum number of synchronization messages supportable by the master, the state of synchronization may be determined to be "synchronization impossibility". The "synchronization impossibility" state may appear in the case where a manager's intervention is needed or in the case where there are complex external factors making synchronization impossible.

If the "synchronization impossibility" state is determined by the state-of-synchronization determiner 130, the next operation may be performed according to a predetermined policy. For example, synchronization between the master and the slaves is terminated, or synchronization may be continuously performed based on the maximum number of synchronization messages supportable by the master or based on the reference number of synchronization messages until a manager intervenes. If a policy for adjusting the number of synchronization messages to the reference number of synchronization messages when the state of synchronization is "synchronization impossibility" has been set, the number-ofmessages adjustor 140 may adjust the number of synchronization messages to the reference number of synchronization messages.

If there are a plurality of slaves that perform time synchronization with the master and the individual slaves have different optimal numbers of synchronization messages, the number-of-messages adjustor 140 applies different numbers of synchronization messages to the respective slaves or decides an optimal number of synchronization messages, which will be sent to all the slaves, according to criteria for deciding an optimal number of synchronization messages for a plurality of slaves. For example, the number-of-messages adjustor 140 may adjust the numbers of synchronization messages, which will be respectively sent to the remaining slaves, based on a slave requiring a greatest optimal number of synchronization messages.

According to another aspect, the time synchronization apparatus 100 may further include a policy setting unit 110. The policy setting unit 110 may set various time synchronization policies that are essential for time synchronization. The time synchronization policies may define a reference number of synchronization messages as described above, a range of the numbers of synchronization messages supportable by the master, criteria for deciding an optimal number of synchronization messages for a plurality of slaves, a processing procedure in the case of "synchronization impossibility", etc. Here, the range of the numbers of synchronization messages supportable by the master may be information about minimum and maximum numbers of synchronization messages, and the criteria for deciding the optimal number of synchronization messages for the plurality of slaves may be criteria for setting the number of synchronization messages that will be sent from the master when the master has determined that the slaves have different optimal numbers of synchronization messages as the result of time synchronization with the individual slaves.

Figure 3:
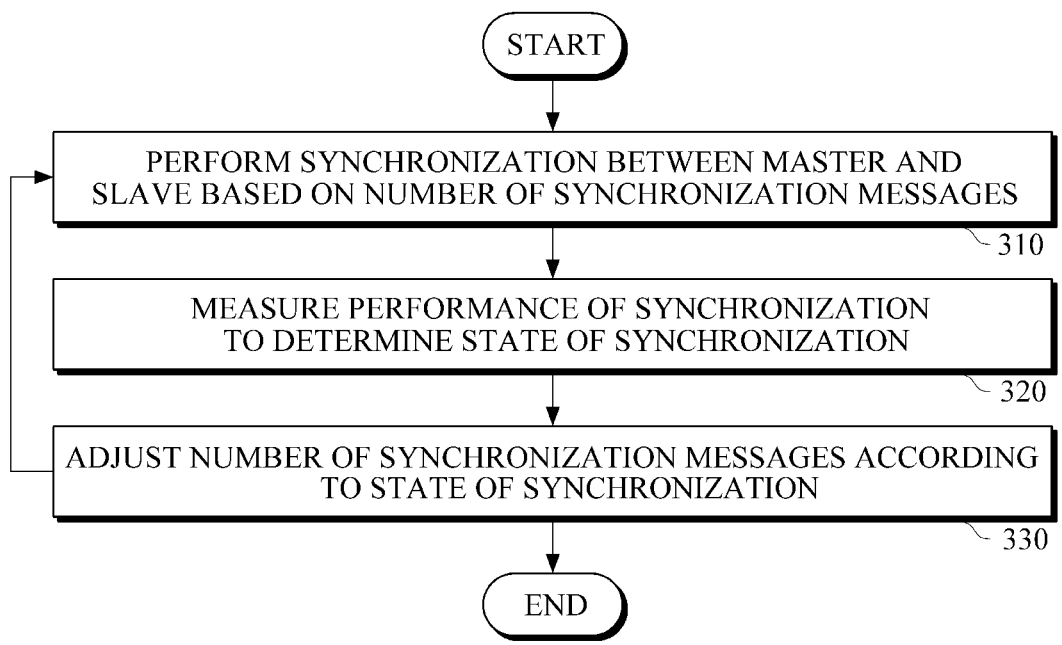
FIG. 3 is a flowchart illustrating an example of a time synchronization method.

FIG. 3 is a flowchart illustrating an example of a time synchronization method. Hereinafter, a time synchronization method through automatic adjustment in number of sending synchronization messages of a master will be described with reference to FIG. 3, wherein the time synchronization method is performed by the time synchronization apparatus 100 illustrated in FIG. 2. Referring to FIG. 3, the time synchronization apparatus 100 may perform time synchronization between a master and at least one slave based on the number of sending synchronization messages of the master (310). At this time, the time synchronization may be performed using a unique algorithm that supports the IEEE 1588 PTP as described above. An initially set number of synchronization messages may be a reference number of synchronization messages, and the reference number of synchronization messages may be adjusted according to a measured performance of synchronization.

Then, the time synchronization apparatus 100 measures the performance of the synchronization to thereby determine the state of the synchronization (320). The state of the synchronization may be determined to be one of "message stability", "synchronization stability", "synchronization instability", and "synchronization impossibility" as described above. The "synchronization stability" state corresponds to the case where the measured performance of synchronization is within a predetermined threshold value, the "message stability" state corresponds to the case where the number of synchronization messages does not need to be adjusted any longer while "synchronization stability" is being maintained, and the "synchronization impossibility" state corresponds to the case where no synchronization can be carried out through adjustment in number of synchronization messages while "synchronization instability" is being maintained.

Then, the time synchronization apparatus 100 may adjust the number of synchronization messages according to the determined state of the synchronization (330). If the state of the synchronization is "synchronization stability", the time synchronization apparatus 100 decreases the number of synchronization messages by a predetermined value, and if the state of the synchronization is "synchronization instability", the time synchronization apparatus 100 increases the number of synchronization messages by the predetermined value. Meanwhile, if the state of the synchronization is "message stability", the time synchronization apparatus 100 does no longer adjust the number of synchronization messages, and if the state of the synchronization is "synchronization impossibility", the time synchronization apparatus 100 may adjust or maintain the number of synchronization messages according to a predetermined policy.

The operations following the operation 310 are repeatedly performed, and in the case of "synchronization impossibility", the process may be terminated according to the predetermined policy or by a manager's intervention.

Figure 4:
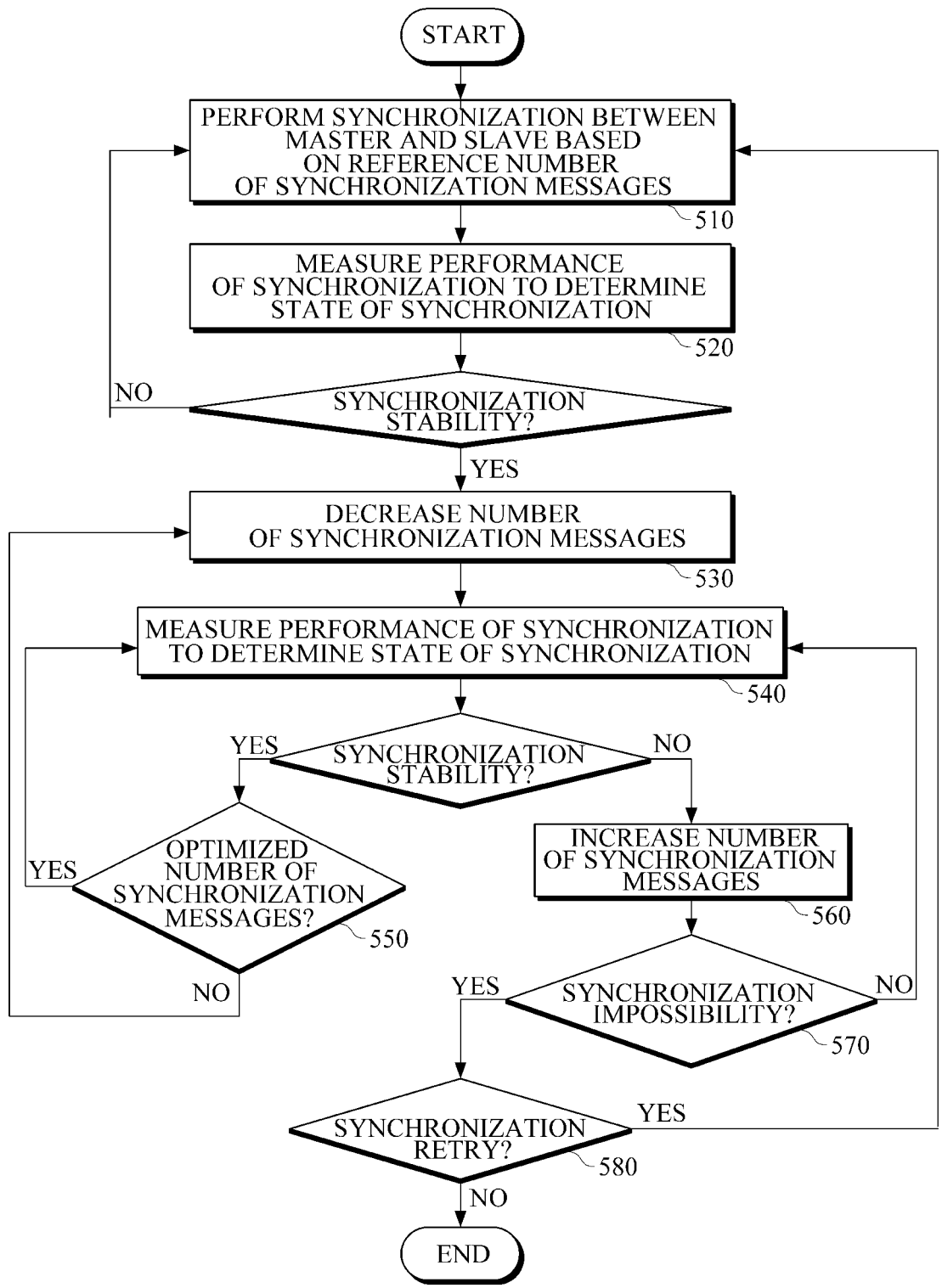
FIG. 4 is a detailed flowchart illustrating the time synchronization method.

FIG. 4 is a detailed flowchart illustrating the time synchronization method. Hereinafter, a time synchronization method which the time synchronization apparatus 100 of FIG. 2 performs time synchronization through automatic adjustment in number of synchronization messages will be described in detail with reference to FIG. 4.

First, the time synchronization apparatus 100 may perform, when a master starts to operate, time synchronization with at least one slave based on a reference number of synchronization messages using a unique time synchronization method (510). Here, the reference number of synchronization messages may be set to an arbitrary value that has been set in advance by a manager through preprocessing. For example, the reference number of synchronization messages may be an intermediate value between maximum and minimum numbers of synchronization messages supportable by the master.

Then, the time synchronization apparatus 100 measures the performance of the synchronization to thereby determine the state of the synchronization (520). If the performance of the synchronization is measured to be within a predetermined threshold value, the time synchronization apparatus 100 may determine the state of the synchronization to be "synchronization stability", and if the performance of the synchronization is not within the predetermined threshold value, the time synchronization apparatus 100 may determine the state of the synchronization to be "synchronization instability". At this time, determination on whether synchronization is successful may be carried out by using variables provided by a unique time synchronization method of the master or by applying a predetermined range of drift time. If synchronization initially performed based on the reference number of synchronization messages is not stabilized, the reference number of synchronization messages is repeatedly used to perform time synchronization.

If the measured performance of the synchronization is within the predetermined threshold value, that is, if the state of the synchronization is "synchronization stability", the process enters operation of reducing the number of synchronization messages, so that the number of synchronization messages is decreased by a predetermined value (530). The predetermined threshold value may be adjusted to one or more predetermined values according to environmental factors (for example, network traffic, the state of the master or slave, etc.).

Then, the performance of the synchronization is again measured based on the adjusted number of synchronization messages to thereby determine the state of the synchronization (540). At this time, the state of the synchronization may be determined to be "synchronization stability" or "synchronization instability".

Then, if the state of the synchronization is "synchronization stability", it is determined whether the state of the synchronization is "message stability" which corresponds to an optimal number of synchronization messages and in which the number of synchronization messages does not need to be adjusted any longer (550). For example, if a current number of synchronization messages is a minimum number of synchronization messages supportable by the master, if the performance of synchronization measured after decreasing the number of synchronization messages is not within the predetermined threshold value and thus the performance of synchronization again measured after increasing the number of synchronization messages is determined to "synchronization stability", or if the performance of synchronization measured after increasing the number of synchronization messages is within the predetermined threshold value and thus the synchronization is stabilized, the state of the synchronization may be determined to be "message stability". If the state of the synchronization is "message stability", the number of synchronization messages is no longer adjusted, and the operations following the operation 540 are repeatedly performed, and if the state of the synchronization is not "message stability", the operations following the operation 530 of decreasing the number of synchronization messages may be repeatedly performed.

If it is determined in the operation 540 that the state of the synchronization is determined to be "synchronization instability", the number of synchronization messages is increased by a predetermined value (560). Likewise, the predetermined value may be adjusted to one or more values according to environmental factors (for example, network traffic, the state of the master or slave, etc.).

Then, it is determined whether the increased number of synchronization messages exceeds a maximum number of synchronization messages supportable by the master, that is, whether the state of the synchronization is "synchronization impossibility" (570). If it is determined that the state of the synchronization is not "synchronization impossibility", the performance of the synchronization is measured based on the increased number of synchronization messages, and the operations following the operation 540 of determining the state of the synchronization may be repeatedly performed. At this time, if the increased number of synchronization messages exceeds a maximum number of synchronization messages supportable by the master, the state of the synchronization may be determined to be "synchronization impossibility". However, this is only exemplary, and the "synchronization impossibility" state may be defined based on various criterion and set according to a time synchronization policy.

If it is determined that the state of the synchronization is "synchronization impossibility", it may be determined whether a set policy is "synchronization retry" (580). According to an aspect, time synchronization with the slave may be terminated according to the set policy. According to another aspect, the number of synchronization messages is adjusted to the reference number of synchronization messages of the master and the operations following the operation 510 may be repeatedly performed.

According to the examples as described above, by automatically adjusting the number of synchronization messages adaptively according to network traffic, changes in resource state of a master or slaves, etc., an optimal synchronization state may be always maintained.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A time synchronization apparatus for performing time synchronization by automatically adjusting a number of synchronization messages that are sent from a master, the apparatus comprising:
    a synchronization unit configured to perform time synchronization between the master and at least one slave based on the number of synchronization messages that are sent from the master;
    a state-of-synchronization determiner configured to measure performance of the synchronization to thereby determine the state of the synchronization; and
    a number-of-messages adjustor configured to adjust the number of synchronization messages based on the state of the synchronization, wherein
    the state-of-synchronization determiner determines the state of the synchronization to be synchronization stability if the performance of the synchronization is measured to be within a predetermined threshold value, and if the measured performance of the synchronization is not within the predetermined threshold value, the state-of-synchronization determiner determines the state of the synchronization to be synchronization instability.

2. The time synchronization apparatus of claim 1, wherein the number-of-messages adjustor decreases the number of synchronization messages by a predetermined value if the state of the synchronization is determined to be synchronization stability, and increases the number of synchronization messages by the predetermined value if the state of the synchronization is determined to be synchronization instability.

3. The time synchronization apparatus of claim 2, wherein if the performance of synchronization measured when a number of synchronization messages resulting from decreasing the number of synchronization messages by the predetermined value reaches a minimum number of synchronization messages supportable by the master is determined to be synchronization stability, or if the performance of synchronization measured after increasing the number of synchronization messages by the predetermined value is determined to be synchronization stability, the state-of-synchronization determiner determines the state of the synchronization to be message stability.

4. The time synchronization apparatus of claim 2, wherein the state-of-synchronization determiner determines, if a number of synchronization messages resulting from increasing the number of synchronization messages by the predetermined value exceeds a maximum number of synchronization messages supportable by the master, the state of the synchronization to be synchronization impossibility.

5. The time synchronization apparatus of claim 4, wherein the number-of-messages adjustor adjusts, if the state of the synchronization is determined to be synchronization impossibility, the number of synchronization messages to a reference number of synchronization messages.

6. A time synchronization apparatus for performing time synchronization by automatically adjusting a number of synchronization messages that are sent from a master, the apparatus comprising:
  a synchronization unit configured to perform time synchronization between the master and at least one slave based on the number of synchronization messages that are sent from the master;
  a state-of-synchronization determiner configured to measure performance of the synchronization to thereby determine the state of the synchronization;
  a number-of-messages adjustor configured to adjust the number of synchronization messages based on the state of the synchronization; and
  a policy setting unit configured to set a time synchronization policy including a reference number of synchronization messages.

7. The time synchronization apparatus of claim 6, wherein the time synchronization policy further defines a range of numbers of synchronization messages supportable by the master, or criteria for deciding an optimal number of synchronization messages for a plurality of slaves.

8. A time synchronization method through automatic adjustment in number of synchronization messages that are sent from a master, the method comprising:
  performing synchronization between the master and at least one slave based on the number of synchronization messages that are sent from the master;
  measuring the performance of the synchronization to thereby determine the state of the synchronization; and
  adjusting the number of synchronization messages based on the state of the synchronization, and then repeating operations of performing time synchronization between the master and the slave, of measuring the performance of the synchronization to determine the state of the synchronization, and of adjusting the number of synchronization messages based on the state of the synchronization, wherein
  the measuring of the performance of the synchronization to thereby determine the state of the synchronization comprises determining the state of the synchronization to be synchronization stability if the measured performance of the synchronization is within a predetermined threshold value, and if the measured performance of the synchronization is not within the predetermined threshold value, determining the state of the synchronization to be synchronization instability.

9. The time synchronization method of claim 8, wherein the adjusting of the number of synchronization messages that are sent from the master comprises decreasing the number of synchronization messages by a predetermined value if the state of the synchronization is determined to be synchronization stability, and increasing the number of synchronization messages by the predetermined value if the state of the synchronization is determined to be synchronization instability.

10. The time synchronization method of claim 9, wherein the measuring of the performance of the synchronization to thereby determine the state of the synchronization comprises determining the state of the synchronization to be message stability, if the performance of synchronization measured when a number of synchronization messages resulting from decreasing the number of synchronization message by the predetermined value reaches a minimum number of synchronization messages supportable by the master is determined to synchronization stability, or if the performance of synchronization measured after increasing the number of synchronization messages by the predetermined value is determined to synchronization stability.

11. The time synchronization method of claim 9, wherein the measuring of the performance of the synchronization to thereby determine the state of the synchronization comprises determining the state of the synchronization to be synchronization impossibility if a number of synchronization messages resulting from increasing the number of synchronization messages by the predetermined value exceeds a maximum number of synchronization messages supportable by the master.

12. The time synchronization method of claim 11, wherein the adjusting of the number of synchronization messages based on the state of the synchronization comprises adjusting the number of synchronization messages to a reference number of synchronization messages if the state of the synchronization is determined to be synchronization impossibility.

* * * * *